March 2, 1954     D. G. KEENER     2,670,564
FISHHOOK AND LEADER BOX
Filed May 23, 1951
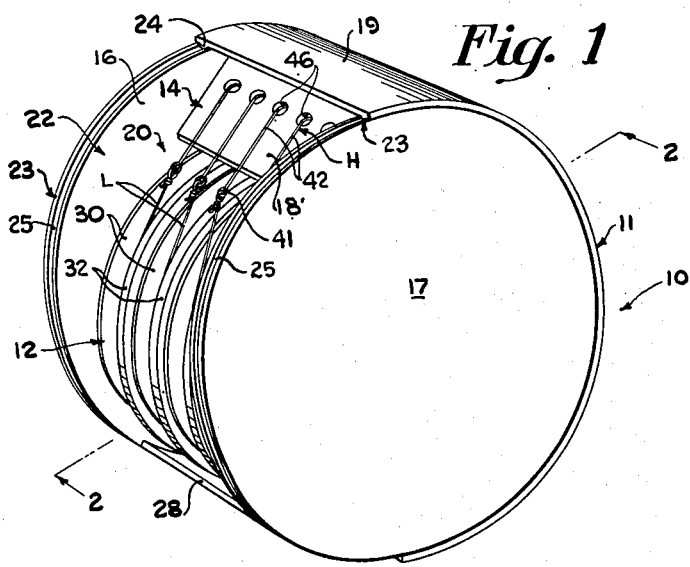
Fig. 1
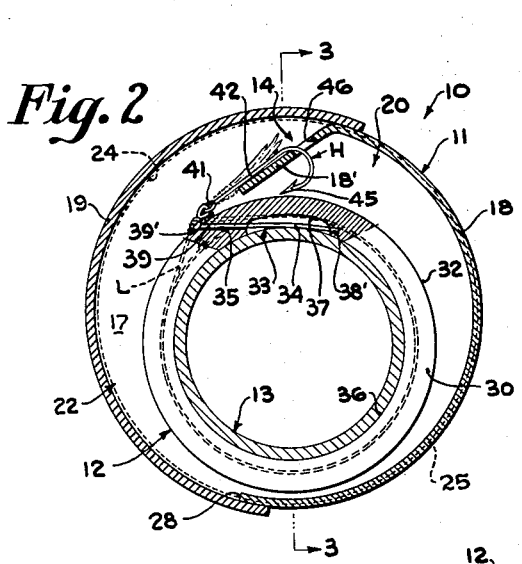
Fig. 2
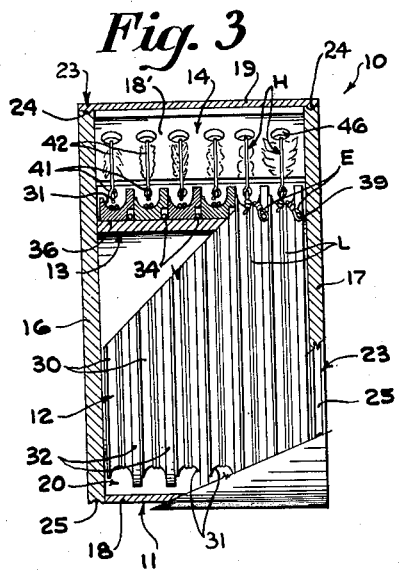
Fig. 3
Fig. 4
INVENTOR.
Donald G. Keener
BY Leslie M. Hansen
HIS ATTORNEY.

Patented Mar. 2, 1954

2,670,564

UNITED STATES PATENT OFFICE 2,670,564

FISHHOOK AND LEADER BOX

Donald G. Keener, Agnew, Calif.

Application May 23, 1951, Serial No. 227,820

5 Claims. (Cl. 43—57.5)

This invention relates to receptacles and more particularly to a box for holding a fishhook and leader or snell in a manner for ready use.

The problem of carrying fishhooks and tackle therefor is notoriously a vexing one in view of the tendency of these articles to become tangled and fouled if not properly handled and stored. Most sportsmen make it a practice to prepare their hooks and lines during leisure hours rather than while they are engaged in the pastime of fishing. It is customary to tie a snell or gut leader of sufficient length to a hook so that the leader and hook is available for use or interchange with other hooks without too much delay.

It is a principal object of this invention to provide a device for holding a hook and leader regardless of the length of the leader.

Another object is to provide a hook and leader holder which is readily adaptable to various sized hooks and leaders and which will keep each hook and leader assembly separate from other such assemblies.

Yet another object of this invention is to provide a suitable and compact casing for one or more hook and leader assemblies so disposed within the casing for ready removal therefrom.

Still another object is to provide a casing having an open side exposing a friction type sheave for receiving the leader and for holding the latter tight relative to a hook anchorage also accessible through the open side of the casing.

A further object is to provide a casing having a hook anchorage cooperable with a snell coiling sheave and a friction brake on such sheave for receiving the looped end of the snell.

These and other objects of the present invention will become more apparent in the following description when read in the light of the drawings in which:

Fig. 1 is a perspective view of a hook and leader holder constructed in accordance with the present invention.

Fig. 2 is a section of Fig. 1 as seen substantially from line 2—2 thereof.

Fig. 3 is a section transverse to that of Fig. 2 and taken along line 3—3 thereof with the exception of certain portions thereof being shown partially in elevation.

Fig. 4 is a fragmentary detail of one sheave and its friction anchorage.

In the drawing 10 indicates the hook and leader holder which generally comprises a casing 11, a sheave 12 and a sheave support or hub 13 disposed in the casing for cooperation with a hook anchorage 14.

The casing 11 has flat walls 16 and 17 spaced from each other by a perimetrical edge wall 18, one portion 19 of which is removable to provide a cover for gaining access to the interior chamber 20 provided by the casing.

The casing 11 is preferably of cylindrical shape, the flat walls 16 and 17 being discs, the perimetrical wall 18 being joined to or adjacent the periphery of the disc shaped walls. In this connection the wall 18 extends arcuately only about half way around relative to the periphery of the discs so as to form an opening 22 in the normal perimeter of the casing.

The opening 22 is adapted to be closed by the removable cover portion 19 of the perimetrical wall of the casing. This cover portion 19 is formed to fit around the periphery of the discs 16—17 and the arcaute wall 18 slightly more than one half of the circumference of the casing. In other words, the cover portion 19 is sprung onto the periphery of the casing so as to grip the same but is sufficiently free to ride around the casing relative to the opening 22 to facilitate opening and closing of the latter.

Means 23 for interlocking and guiding the cover portion 19 relative to the casing comprises a bead 24 on the cover and a complementary groove 25 formed in the periphery of the casing, preferably in the peripheral edge of each disc 16—17 as seen in Figs. 1 and 3.

One end 18' of the arcuate wall 18 forms the base of the hook anchorage 14. This end 18' is bent inwardly relative to the circumference of the casing and has its edges suitably secured to the inner face of the adjacent flat disc wall 16 or 17 as the case may be. This serves as a reinforcing between the two walls 16—17 of the casing 11.

The medial portion of each flat disc wall 16 and 17 is further stiffened and strengthened by the hub 13 which is preferably a cylinder having its ends suitably secured to the respective inner surfaces of the discs 16 and 17.

A plurality of sheaves 12 are mounted on the hub 13 for rotation relative thereto and independent of each other. As best seen in Fig. 2 the hub 13 and sheaves 12 carried thereby are disposed eccentric relative to the disc walls 16—17. In this manner the sheaves are conveniently spaced from and between the hook anchorage 14 and the edge 28 of the arcuate wall 18 diametrically opposite the anchorage 14.

Each sheave 12, Figs. 3 and 4, is an independent ring 30 having an annular groove 31 formed in its periphery. The groove 31 is formed slightly to one side of the ring 30 so as to provide a raised flange 32 adjacent the opposite side of the ring. Each ring 30 carries a braking means 33 in the form of a spring bar 34. This bar 34 is inserted into a bore 35 extending into the flange 32 in a direction which is chordally disposed relative to the inner periphery 36 of the ring. In other words, part of the bore 35 opens onto the periphery 36 so that the spring bar 34 bears against the periphery of the hub 13 to resist and restrain rotation of the ring 30 relative thereto.

If desired, the ring 30 can be cut away as at 37 in the region in which the spring bar 34 engages the hub 13 so as to allow for the yielding action of the spring bar 34 over the arcuate periphery of the hub 13.

The inner end 38 of the spring bar 34 is suitably anchored in the base 38' of the bore 35 while the opposite end 39 of the bar 34 extends outwardly from the entrance 39' of the bore 35 to provide an anchorage for the looped end E of a leader L.

The leader L has its end opposite the loop E tied to the eye 41 on the shank 42 of a fishhook H. This hook H may be plain or it may have feathers, hair or the like tied onto its shank 42 simulating the body of an insect or fly to thereby conceal the hook H. In either case the barbed portion 45 of the hook H is adapted to be inserted through an aperture 46 formed in the hook anchorage 14 as best seen in Fig. 2.

It should here be noted that the one end 18' which forms the base of the hook anchorage 14, is disposed in a plane which is substantially tangential to the periphery of the several sheaves 12. Consequently, each hook H is hung on the anchorage 14 in a manner to dispose the shank 42 of each hook in convenient tangential alignment with the sheave upon which its leader L is to be wound.

The looped end E of the leader is encircled around the extended end 39 of the spring bar 34 and the ring 30 associated therewith is then rotated counterclockwise Figs. 1 and 2. In this manner the leader L is wound about the groove 31 formed in such sheave ring 30 in a neat and accessible coil. Irrespective of the length of the leader L it will be coiled about the sheave in the foregoing manner, it being understood that a person guides and tautens the leader with the fingers of one hand while he uses the other hand to rotate the sheave ring 30.

The leader is coiled about a sheave ring in the foregoing manner until the hook H attached is tightened onto the hook anchorage 14 as shown in Fig. 2. The spring bar 34 on the sheave 12 about which the leader is coiled bears against the periphery of the hub 13 sufficiently to resist any rotation of such sheave other than by manipulation. However, when an angler desires to remove a particular hook and leader from the holder 10 he merely pulls slightly on the end of the leader where it is tied to the hook so as to get enough slack to remove the crooked end 50 of the hook from the hole 46 in the hook anchorage 14. The hook thus detached from the anchorage can then be pulled away from the holder 10 to rotate the sheave ring 30 against the action of the spring bar 34.

While I have described my new hook and leader holder in specific detail it will be understood that the same is susceptible to modifications, alterations and/or variations without departing from the spirit of my invention. I therefore desire to avail myself of all modifications, alterations and variations as fairly come within the purview of the following claims.

What I claim as new and desire to protect by Letters Patent is:

1. A holder for a fishhook tied to one end of a leader having a looped opposite end, comprising a casing including a pair of disc side walls spaced from each other, a perimetrical wall extending between said side walls and having ends spaced from each other to provide marginal edges of an opening for gaining access to the interior of said casing, a cover for said opening, a hub extending between said side walls, a ring shaped sheave in concentric relation to and rotatable on said hub, one marginal edge of said perimetrical wall extending into said casing tangentially toward a portion of the periphery of said sheave and having an aperture for providing a hook anchorage for said fishhook, and brake means on said sheave for restraining rotation thereof other than by manipulation comprising a spring bar extending into said sheave in a direction chordally of the inner periphery thereof for yielding engagement with said hub and extending beyond the outer periphery of said sheave to provide an anchorage for said looped end of said leader cooperating with said hook anchorage for effecting tight coiling of said leader around said sheave upon manual rotation of said sheave.

2. A holder for a fishhook tied to one end of a leader having a looped opposite end, comprising a casing including a pair of disc side walls spaced from each other, a perimetrical wall extending between said side walls and having ends spaced substantially diametrically opposite each other to provide marginal edges of an opening in the periphery of said casing, a cover for said opening formed to extend more than half way around the periphery of said side walls for grippingly engaging the latter, means on said casing and cover for guiding the latter for sliding movement around the periphery of said casing, a hub extending between said disc side walls, a ring shaped sheave in concentric relation to and rotatable on said hub, one marginal edge of said perimetrical wall extending into said casing tangentially toward a portion of the periphery of said sheave and having an aperture for providing a hook anchorage, and a spring bar extending into the outer periphery of said sheave in a direction chordally of the inner periphery thereof for engaging said hub to restrain rotation of said sheave other than by manual rotation thereof, said spring bar having one of its ends extending beyond the outer periphery of said sheave for receiving the looped end of said leader for facilitating coiling of said leader around said sheave upon manual rotation of said sheave.

3. A holder for a fishhook tied to one end of a snell having its opposite end provided with a loop, comprising a generally cylindrical casing having disc side walls spaced from each other, a perimetrical wall extending between and substantially half way round the perimeter of said side walls to provide an opening in said casing, a cover for said opening fitting around the periphery of said discs and grippingly engaging the same, guide means for said cover permitting movement thereof peripherally of said casing, a hook anchorage extending inwardly of said casing adjacent one marginal edge of said opening along the perimetrical wall of said casing, a hub between said side walls and eccentric relative thereto, a ring shaped sheave rotatable on said hub and a spring bar extending into said sheave in a direction chordally of its inner periphery for engaging the periphery of said hub for restraining rotation of said sheave other than by manual force, said spring bar having one of its ends extending beyond the outer periphery of said sheave for forming an anchorage for the looped end of said leader for coiling said leader around said sheave until it is tautened relative to the hook secured to said hook anchorage.

4. A holder for a fishhook tied to one end of a leader having a looped opposite end, comprising a case including a pair of disc side walls spaced from each other, a hub between said side walls and having its ends secured to said side walls eccentrically of the periphery of said side walls, a generally cylindrical sheave in concentric relation to and rotatable on said hub, a hook anchorage extending between said side walls and tangentially toward a portion of the periphery of said sheave where such portion is spaced a greater distance from the periphery of said side walls than other portions of the sheave for receiving said fishhook, means on said sheave for receiving the looped end of said leader for effecting coiling of said leader on said sheave when the latter is rotated about said hub, and brake means on said sheave for restraining rotation thereof other than by manipulation.

5. A holder for a fishhook tied to one end of a leader having a looped opposite end, comprising a case including a pair of side walls spaced from each other, a hub extending between and having its ends secured to said side walls, a ring shaped sheave rotatable on said hub, a hook anchorage extending between said side walls and projecting tangentially toward the outer periphery of said sheave for receiving said fishhook, and brake means on said sheave comprising a spring bar extending into said sheave in a direction chordally of the inner periphery thereof for engagement with said hub, said spring bar extending beyond the outer periphery of said sheave for receiving the looped end of said leader and cooperating with said hook anchorage for tightly coiling said leader around said sheave upon manual rotation of said sheave.

DONALD G. KEENER.

References Cited in the file of this patent

UNITED STATES PATENTS

| Number | Name | Date |
|---|---|---|
| 2,448,728 | Omohundro | Sept. 7, 1948 |
| 2,494,106 | Rengo | Jan. 10, 1950 |
| 2,517,866 | Glahn | Aug. 8, 1950 |